United States Patent [19]

Anemogiannis

[11] Patent Number: 6,034,809

[45] Date of Patent: Mar. 7, 2000

[54] OPTICAL PLASMON-WAVE STRUCTURES

[75] Inventor: Emmanuel Anemogiannis, Atlanta, Ga.

[73] Assignee: Verifier Technologies, Inc., Duluth, Ga.

[21] Appl. No.: 09/048,489

[22] Filed: Mar. 26, 1998

[51] Int. Cl.[7] ..................................................... G02F 1/035
[52] U.S. Cl. ........................ 359/254; 359/245; 359/255; 385/2; 385/8; 385/9; 385/10
[58] Field of Search ................................. 385/2, 8, 9, 10, 385/37; 359/245, 254, 255

[56] References Cited

U.S. PATENT DOCUMENTS

| | | | |
|---|---|---|---|
| 4,432,614 | 2/1984 | McNeill et al. | 359/245 |
| 4,765,705 | 8/1988 | Seymour et al. | 385/37 |
| 4,948,225 | 8/1990 | Rider et al. | 428/411.1 |
| 4,971,426 | 11/1990 | Schildkraut et al. | 307/430 |
| 5,067,788 | 11/1991 | Jannson et al. | 385/2 |
| 5,157,541 | 10/1992 | Schildkraut et al. | 359/276 |
| 5,625,729 | 4/1997 | Brown | 385/31 |
| 5,729,641 | 3/1998 | Chandonnet et al. | 385/2 |

OTHER PUBLICATIONS

Michael N. Zervas; "Surface Plasmon–Polariton Waves Guided by Thin Metal Films"; Optics Letters; vol. 16, No. 10; May 15, 1991.

Creaney et al.; "Continuous–Fiber Modulator with High–Bandwidth Coplanar Strip Electrodes"; IEEE Photonics Technology Letters; vol.8, No. 3; Mar. 1996; pp. 355–357.

Wilkinson et al.; "Optical Fibre Modulator Using Electro–Optic Polymer Overlay"; Electronics Letters; May 23, 1991; vol. 27, No. 11; pp. 979–981.

Tseng et al.; "Side–polished Fibers"; Applied Optics; vol. 31, No. 18; Jun. 20, 1992; pp. 3438–3447.

Shuto et al; "Optical Intensity Modulators Using Diazo–Dye–Substituted Polymer Channel Waveguides"; IEEE Journal of Quantum Electronics, vol. 31, No. 8, Aug. 1995.

Erdogan; "Fiber Grating Spectra"; Journal of Lightwave Technology; vol. 15, No. 8; Aug. 1997.

Stegeman et al.; "Long–Range Surface Plasmons in Electrode Structures"; Appl. Phys. Lett.; 43(3), Aug. 1, 1993; pp. 221–223.

Kajenski; "Tunable Optical Fiber Using Long–Range Surface Plasmons"; Society of Photo–Optical Instrumentation Engineers; 36(5); 1537–1541; May 1997.

Caldwell et al.; "Surface–Plasmon Spatial Light Modulators Based on Liquid Crystal"; Applied Optics; vol. 31, No. 20; Jul. 10, 1992; pp. 3880–3891.

Anemogiannis et al.; "Optimization of Multilayer Integrated Optics Waveguides"; IEEE 1994; pp. 512–518.

Jung et al.; "Integrated Optics Waveguide Modulator Based on Surface Plasmon Resonance"; Journal of Lightwave Technology; vol. 12, No. 10, Oct. 1994; pp. 1802–1806.

Jung et al.; "Electro–Optic Polymer Light Modulator Based on Surface Plasmon Resonance"; Applied Optics; vol. 34, No. 6; Feb. 20, 1995; pp. 946–949.

Bonch–Bruevich et al.; "Surface Electromagnetic Waves in Optics"; Optical Engineering; vol. 31, No. 4; Apr. 1992; pp. 718–729.

Primary Examiner—Georgia Epps
Assistant Examiner—Margaret Burke
Attorney, Agent, or Firm—Morris, Manning & Martin, LLP

[57] ABSTRACT

Optical plasmon-wave attenuator and modulator structures for controlling the amount of coupling between an guided optical signal and a surface plasmon wave. Optical power coupled to the plasmon wave mode is dissipated in varying amounts producing an intensity modulation effect on the optical signal. For electrical modulation, an additional dielectric (or polymer) layer with variable refractive index in optical contact with a metal layer supporting at least one plasmon wave mode is used to perturb or vary the propagation constant of plasmon wave. Propagation constant variation results in the power coupling variation between the surface plasmon wave and the optical wave. The refractive index variation of the dielectric (or polymer) layer can be accomplished via an electro-optic traveling-wave, a lump-element, or any other integrated optics modulator configuration situated to affect the layer, thereby permitting data rates into tens of GHz. Because of the extremely small interaction lengths needed, the optical plasmon-wave modulator is a very compact device which can be implemented on the top of a fiber or as an integrated optical planar structure.

53 Claims, 7 Drawing Sheets

$$K_{SPW}$$

$$K_g \quad K_G \quad K_G$$

$$K_{SPW} = K_g + 2K_G$$

FIG.4a

$$K_{SPW} \quad K_G \quad K_G$$

$$K_g$$

$$K_{SPW} = K_g - 2K_G$$

FIG.6a

OPTICAL PLASMON-WAVE STRUCTURES

BACKGROUND OF THE INVENTION

1. Field of the Invention

The present invention generally relates to an optical structures and methods of making such structures, and more particularly, to an optical structures including attenuators and modulators which vary the intensity of a guided lightwave by controlling the amount of power coupling between a guided light mode and a surface plasmon wave mode.

2. Description of Background Art

A surface plasmon wave (SPW) is an electromagnetic wave which propagates along the interface between two materials having dielectric constants of opposite signs, e.g., a metal and a dielectric layer. The polarization of a SPW is transverse magnetic (TM) since its electric field is perpendicular to the propagation interface. SPWs can be analyzed by techniques used for TM optical modes since they obey identical field equations and satisfy the same boundary conditions. Unique features of SPWs are that almost all of their energy is concentrated at the dielectric/metal interface and their propagation characteristics are very sensitive to environmental changes in their proximity.

Optical plasmon wave structures can be made by employing a device which converts an optical guided lightwave into a SPW. By controlling the amount of power coupling between the optical signal and the SPW, optical power may be dissipated producing an attenuation of the optical signal. If the amount of coupling is controlled by the physical design of the device, an attenuation device can be provided. If the amount of coupling is controlled electrically, a variable attenuator (modulator) device can be provided.

Because SPWs are very sensitive to environmental changes, introducing an additional dielectric (or polymer) layer with electrically variable refractive index (an electro-optic or EO layer) in contact with the metal layer supporting the SPW will cause variations in the propagation constant of the SPW. These propagation constant variations result in power coupling variation between the SPW and the optical wave and consequently modulation of the optical wave. The refractive index variation of the dielectric/polymer layer can be accomplished via optics modulator configuration situated on the top of the layer.

Because of the extremely small interaction lengths needed, the optical plasmon wave modulator can be a very compact device which can be implemented as an integrated optics structure. This small size and other advantages of the device can produce substantial benefits with its use in the electronics and communications areas.

However, attempts to develop a practical optical SPW modulator which could be commercialized have not been successful. Other technologies, for example electro-optic (EO) modulators and semiconductor absorption modulators continue to dominate devices which have been commercialized. There is only one demonstration of planar integrated optics SPW modulator in *Novel Integrated Optical Intensity Modulator Based On Mode Coupling* by Driessen, et al., *Fiber Optics,* Vol. 13, pp 445–461, 1994. Another experimental approach is shown in *Integrated Optics Waveguide Modulator Based On Surface Plasmon Resonance* by Jung, et al., *Journal of Lightwave Technology,* Vol. 12, No. 10, October 1994. Two theoretical examples of integrated optics, one planar and the other cylindrical (fiber), SPW modulators are shown in U.S. Pat. No. 5,067,788 issued Nov. 26, 1991 to Jannson, et al. The disclosure of Driessen, et al.; Jung, et al. and Jannson is hereby incorporated by reference. All of foregoing presently exhibit inferior performance, manufacturability and design flexibility to the alternative technologies.

All of the above mentioned disclosures use a generic configuration for SPW generation and modulation control which consists of an EO dielectric (or polymer) layer sandwiched between two metal layers. The SPW is supported in the bottom metal layer of the sandwich and a modulation voltage is applied between the two metal layers to change the refractive index of the EO layer. This combined SPW generation/control configuration, which behaves like a parallel plate capacitor, is attached on the optical structure supporting the guided optical mode. The application of voltage at the electrodes changes the refractive index of the EO layer and consequently the SPW properties, i.e., its propagation constant $\beta_{spw}$, and the coupling coefficient between the SPW and the optical mode.

The deficiencies of this sandwich design are caused primarily by an attempt to combine the modulator control structure with the surface plasmon wave generation and support structure. The combination of these two functions puts severe design constraints on the thickness of the metal layer in which the SPW must be generated. Because electric current penetration is directly related to its frequency (the skin effect), the thickness of the modulator electrodes must always be greater than the required skin depth at the corresponding maximum modulation frequency to avoid high skin resistance. High resistance increases the input voltage for a desired modulation depth and generates heat which is highly undesirable. If intense enough, such heating may damage the metal layer or the EO layer with which the metal layer may be in contact. Particularly vulnerable to heat damage are thin polymer EO layers. Further, the appropriate electrode layer thickness for a given bandwidth may be thinner or thicker than the necessary thickness to support a SPW with the desired propagation constant, $\beta_{spw}$. These two design constraints are often in conflict and may prevent a pragmatic solution at the modulation bandwidth desired and at the wavelength desired for the guided wavevector. Still further, the use of this structure as a modulator is limited because the modulation electrodes act as a parallel plate capacitor. This electrode configuration has high capacitance which greatly limits the overall bandwidth.

Moreover, one of the more useful optical SPW devices would be an wavelength sensitive attenuator or modulator which can be used in an cylindrical integrated optics geometry, such as an optical fiber, where the core of the optical fiber would provide the guiding layer for the guided light wavevector. Because optical fibers are designed for minimal power loss and dispersion at a particular wavelength, their core and cladding material and core thickness are parameters which must be used as a given in the design of optical SPW devices which interface with them. These constraints make it even more difficult to design efficient SPW generation and support structures, particularly if modulation electrode constraints must be simultaneously satisfied.

SUMMARY OF THE INVENTION

The invention provides several implementations of optical SPW structures, specifically attenuators/modulators, which utilize a SPW to attenuate the intensity of a transmitted and guided lightwave. According to the invention, a guided lightwave is supported in a first dielectric layer of a multilayer waveguide that has a metal overlayer which supports at least one SPW mode. A SPW is generated at the interface of the dielectric layer and metal overlayer when phase velocity conditions are satisfied for the coupling of the SPW with the evanescent field portion of the guided lightwave. When the coupling is strong, the light energy is absorbed by the SPW (a very lossy wave) and the intensity of the guided lightwave decreases. When the coupling between the two different waves is less strong, the intensity of the guided light wave is less attenuated.

For an attenuator device, to vary the coupling between the guided lightwave and the SPW, the thicknesses of the metal and dielectric layers and their materials are chosen such that the guided lightwave and the SPW have almost the same phase velocity. In addition, phase matching means including buffer layer(s) can be used to obtain the desired configuration. Preferably, the phase matching means are additional dielectric layers, additional metal layers or other optical structures, such as optical gratings, which modify the evanescent coupling of the light wavevector into the SPW wavevector. According to one aspect of the invention, the coupling can be designed substantially free of any design constraints for modulation electrodes for the structure.

For a modulator device, a modulation structure including an additional EO layer is placed in optical contact with metal layer of the attenuator structure. The refractive index of the EO layer can be varied by an electric field which causes the propagation constant of the SPW to change, thereby changing the amount of optical power of the guided lightwave which is coupled into the SPW. According to one aspect of the invention, the coupling can be designed substantially free of any design constraints for modulation electrodes for the structure.

According to another aspect of the innovation, the modulation of the refractive index of the electro-optic layer is provided by producing a varying electric field from a set of modulation electrodes. Preferably, the electrodes are substantially coplanar and located on top of the EO layer. An alternative embodiment includes locating the modulation electrodes on the sides of the EO layer. This allows a decoupling of the design of the SPW generation structure which is the dielectric layer-metal layer interface and matching means from the design of the modulation structure which is the EO layer and electrode set.

These decoupled or independent structures have many distinct advantages because a parallel plate capacitor electrode configuration with its large capacitance and attendant disadvantages is avoided. Positioning both modulation electrodes on the same side of the electro-optic layer allows the use of a traveling-wave or a lumped-element electrode configuration for the modulator structure implementation. Such modulator configurations have a high bandwidth and can easily reach data rates of 20 GHz.

Moreover, the dedication of a single or multiple metal layer for SPW generation with the decoupled modulation electrodes removes the modulator design constraints on the surface plasmon wave metal layer thickness. The SPW metal layer, as one or more metal components, can be optimized to support the desired propagation constant, $\beta_{spw}$, and the modulator electrode thickness optimized for the desired bandwidth.

Additional objects of the invention are improved techniques for facilitating and maximizing the energy coupling between the SPW and the optical lightwave. Previous SPW modulator designs have used only techniques such as proper material selection and material layer thickness selection for maximizing the coupling between these different types of electromagnetic waves. These coupling techniques have limited effects since the range of design parameters is narrow. For example, the distance between the metal layer and the guiding layer must be minimal for maximum field interaction between the guided lightwave and the SPW, while the EO dielectric layer must also be thin for maximum modulation depth and high modulation rates. In addition, the material selection is also limited to a few metals, e.g. Au, Al, Ag, Cr, Cu, Ca, and In for the SPW support layer, and the EO layer is limited to a few choices which have a refractive index approximately equal to 1.5 for selected polymers, 2.2 for lithium niobate or titanium niobate, and 3.3 for semiconductor materials. Therefore, there have been many severe constraints which have prevented the design of a modulator which couples the optical lightwave to the SPW in an highly efficient manner.

The invention provides the several embodiments of the attenuator and modulator with an optical grating, preferably either an index grating or a surface relief grating, which maximizes the energy coupling between the guided lightwave and the SPW. The maximum energy coupling is accomplished by matching the phase velocities of the two wavevectors with an optical grating of suitable period. In principle, there will always be a grating with the appropriate period that can match the phase velocities of the two different electromagnetic waves.

These and other objects, aspects and features of the invention will be more clearly understood and better described when the following detailed description is read in conjunction with the attached drawings, wherein:

BRIEF DESCRIPTION OF THE DRAWINGS

FIG. 4a is a graphical representation of the matching condition provided by the grating for the embodiment illustrated in FIG. 4;

FIG. 6a is a graphical representation of the matching condition provided by the grating for the embodiment illustrated in FIG. 6;

DETAILED DESCRIPTION OF A PREFERRED EMBODIMENT

Figure 1:
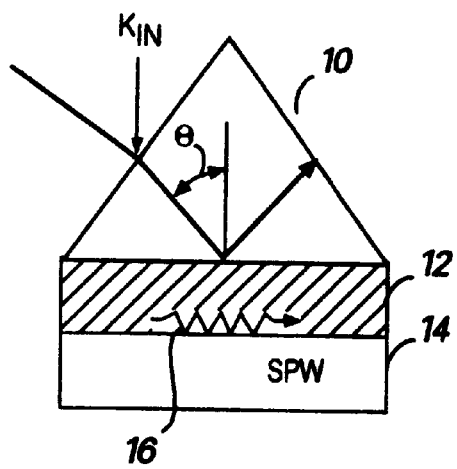
FIG. 1 is a cross-sectional side view of a prior art bulk optics structure for generating a SPW.

FIG. 1 illustrates a prior art method of generating a surface plasmon wave. A high index optical prism 10 is used with a thin metal layer 12 evaporated on its base and mounted on a dielectric base 14.

The incident light wavevector, at wavelength $\lambda$, inside the prism 10 is:

$$K_{IN} = n_P \sin\theta 2\pi/\lambda$$

where $n_p$ is the prism refractive index and $\theta$ is the angle of incidence. The evanescent electromagnetic field from the incident TM polarized light penetrates the metal layer 12 and when an angle $\theta_{SPW}$ satisfies the matching condition:

$$n_p \sin\theta_{SPW} \, 2\pi/\lambda = K_{SPW} = \beta_{SPW} \, 2\pi/\lambda$$

then a SPW 16 is generated in the metal layer 12. As previously described $\beta_{SPW}$ is the propagation constant of the SPW and depends on the refractive index and thickness of the metal layer 12. Since the SPW is excited via the evanescent fields of the lightwave, this method will be termed evanescent coupling.

Figure 2A:
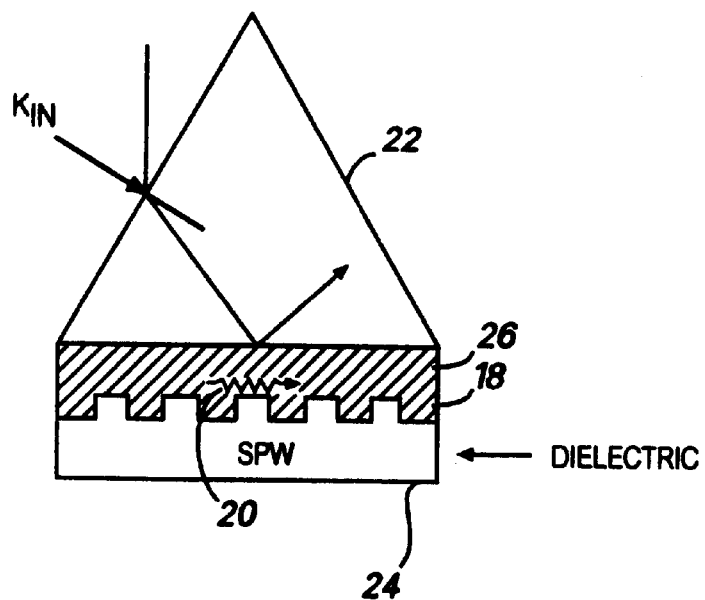
FIG. 2 is a cross-sectional side view of a first embodiment of a bulk optics structure for generating a SPW constructed in accordance with the invention.

According to one preferred embodiment of the invention, another SPW generation structure and method is illustrated in FIG. 2. This method utilizes a grating 18 formed on top of a dielectric 24 to couple the incident lightwave into a SPW 20 in metal layer 26 through the prism 22. According to this method the optical grating 18 forces the incident light wavevector to be equal to the SPW wavevector. Gratings are diffractive periodic structures made by an infinite array of scatterers spaced at equal distances. The grating wavevector is defined as $K_G = 2\pi 7/\Lambda$, where $\Lambda$ is the distance between the scatterers. The condition for the SPW excitation is met when:

$$K_{IN} = K_{SPW} \pm N \, K_G,$$

where N is an integer.

For the case that the incident medium is air, then $n_p = 1$ and $K_{IN} = \sin\theta 2\pi/\lambda$.

Both of the above mentioned SPW excitation techniques can be seen as energy converters which convert a portion of the energy of an externally incident lightwave to a SPW which then dissipates that energy in the metal layers 12 and 22, respectively. Intensity modulation of the incident lightwave can be accomplished by varying the incident angle such that more or less coupling is provided.

An integrated optics SPW generation configuration, where the source of energy is a light wavevector with a guided optical mode with propagation constant $\beta_g$ confined in a dielectric layer, can be analyzed similar to the above bulk optics examples. The major difference is that the wavevectors of interest, i.e., the guided wave is $K_g = \beta_g \, 2\pi/\lambda$, and the generated wave $K_{SPW}$ are difficult to vary. The compactness, the dimensional restrictions, and the minimal refractive index variations of an integrated optics structure allow little or no perturbations of $K_g$ and $K_{SPW}$. Moreover, since significant energy can be transferred from an optical guided mode to a SPW mode only when there is significant overlap between the corresponding modal fields where the propagation constants and phase velocities are substantially equal, the possible dielectric layers between the guiding layer and the metal layer must have small and relatively exact thicknesses.

Figure 3:
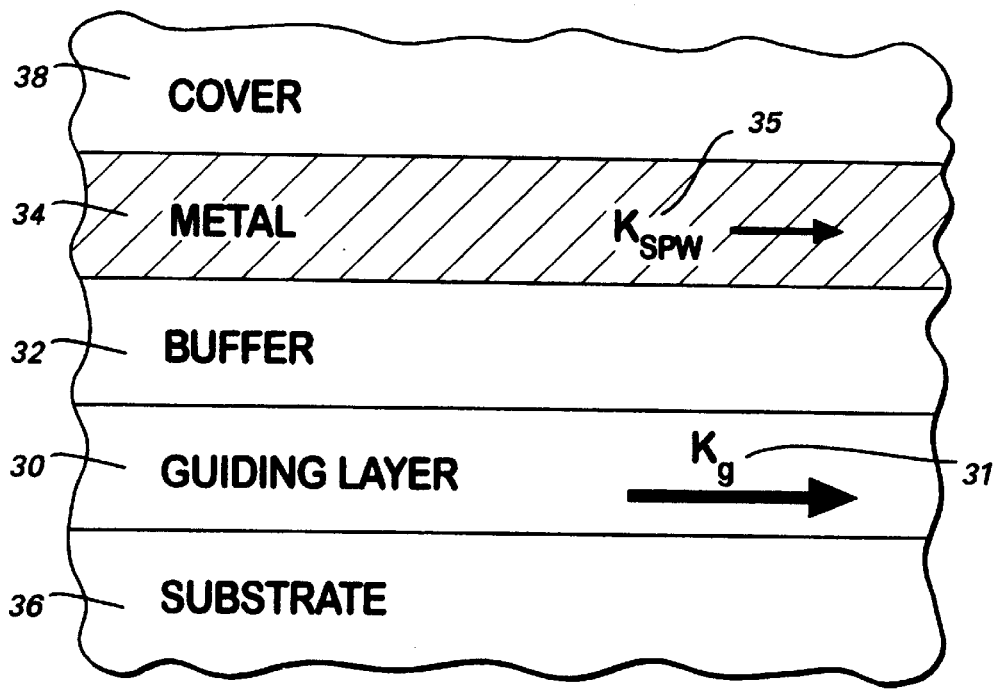
FIG. 3 is a longitudinal cross-sectional side view of a prior art planar integrated optics structure for generating a SPW.

In FIG. 3, a planar integrated optics structure performing the excitation of a SPW by a guided lightwave via evanescent coupling is illustrated in partial cross-section. The multilayer waveguide structure comprises generally, a guiding layer 30, e.g., a dielectric layer in which the major part of the guided lightwave power is confined; and a metal layer 34 in contact with the guiding layer which is necessary for the generation and propagation of a SPW. A substrate layer 36 may be used to support the layers 30 and 34 and a cover layer 38 may be used to protect them from environmental influences, such as physical stress and electrical or magnetic fields, both layers 36 and 38 have semi-infinite thickness when compared to the thickness of the layers 30, 32, and 34. As an example, the metallic layer 34, if a single component, can be gold, or if a multiple component layer, can be chromium and aluminum. Generally, one or more component layers may be used in the metal layer 34 depending upon the final desired design goals. For example, there is some evidence that some multiple metal layers may produce a resonant characteristic that is more wavelength sensitive than some single component layers. Optionally, one or more dielectric buffer layers 32 may be interposed between the metal layer and the guiding layer to modify the SPW characteristics and to reduce the high loss of the guided mode when it is in contact with the metal layer.

The guiding layer will propagate a guided wavevector $K_g$. The metal layer will support a SPW wavevector $K_{SPW}$. Both $K_g$ and $K_{SPW}$ depend on the thicknesses and composition of all layers comprising the optical structure. The optimum condition for SPW generation with evanescent coupling is when $K_g = K_{SPW}$. This is the ideal condition for evanescent coupling where almost all of the power carried by the guided mode can be coupled to the SPW. For those cases where $K_g$ is approximately equal to $K_{SPW}$, only portions of the guided wave power will be coupled to the SPW. The thickness, as well as the composition of all the individualized layers can be determined by a waveguide optimization technique more fully described in *Optimization of Multilayer Integrated Optical Waveguides* by Anemogiannis, et al. published *Journal Lightwave Technology*, Vol. 12, pp 512–517, March 1994, such that the matching condition $K_g = K_{SPW}$ is satisfied. The disclosure of Anemogiannis, et al. is hereby incorporated by reference.

Figure 4:
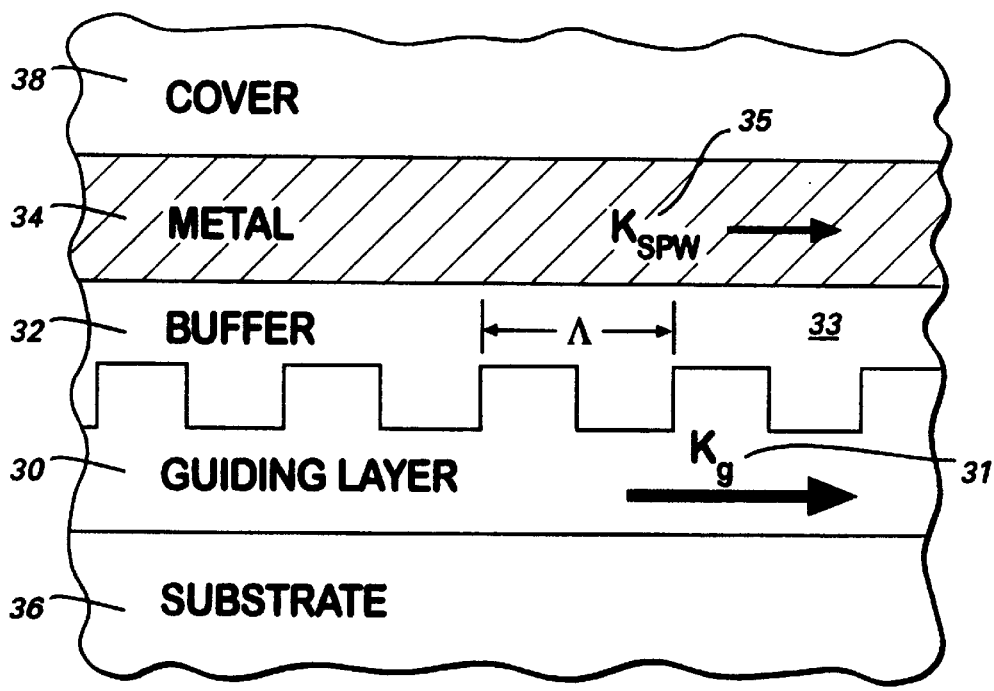
FIG. 4 is a longitudinal cross-sectional side view of a second embodiment of a planar integrated optics structure for generating a SPW constructed in accordance with the invention.

FIG. 4 illustrates another embodiment of the invention where a planar integrated optics structure includes a grating 33 for the most efficient excitation of a SPW. The grating shown is a surface relief grating having a period $\Lambda$ which introduces an additional wavevector $K_G = 2\pi/\Lambda$, which can be used for the phase velocity matching. An example of this is depicted in the graphical representation of FIG. 4$a$. where the grating with an appropriately chosen period can be used to satisfy the matching condition as $K_{spw} = K_g + 2K_G$. The grating may be the surface relief grating shown or an index grating made by producing a periodic variation of the refractive index of the guiding layer 30 of period $\Lambda$. It is important to note that in principle there is always a grating period which can couple any guided mode $K_g$ to any supported SPW mode, $K_{spw}$, since the general matching condition involving the grating is expressed as $K_{spw}=K_g=N\ K_G$, where N is an arbitrary positive integer. The thicknesses and the composition of the individual layers, as well as the grating period are optimized via the optimization technique described in Anemogiannis, et al., such that the condition $K_{spw}=K_g\pm N\ K_G$ is satisfied.

Figure 5:
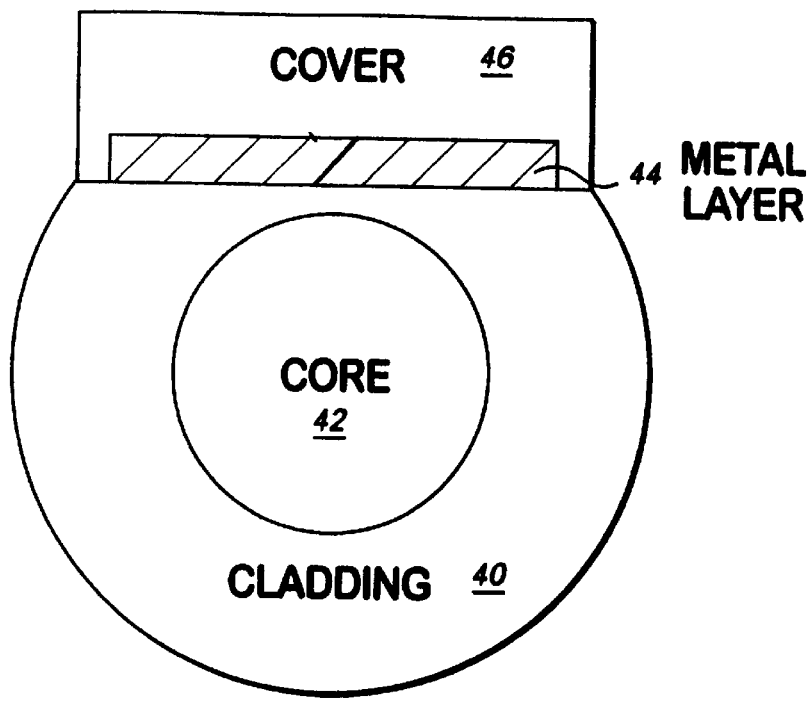
FIG. 5 is a transverse cross-sectional side view of another embodiment of the invention based on a prior art cylindrical integrated optics structure that has been optimized as described herein, sometimes used as an optical polarizer, for generating a SPW.

In FIG. 5 another embodiment of the invention is a cylindrical integrated optics structure capable of performing the excitation of a SPW by a guided lightwave via evanescent coupling is illustrated in partial transverse cross section. A typical example of this geometry is an optical fiber where the core 42 is enclosed by a cladding material 40 and a metal layer 44 is in close proximity to the core after a portion of the cladding has been removed, for example by polishing. The residual cladding portion between the core and the metal layer corresponds to the buffer layer 32 described previously for phase matching. The wavevector matching condition is again $K_{spw}=K_g$, where $K_g$ corresponds to the wavevector of the guided mode which propagates in the fiber core. The thicknesses as well as the composition of all the individual layers, except the core thickness and the core and cladding composition which are given parameters in this instance, are determined by the optimization technique described in Anemogiannis, et al., such that the condition $K_{spw}=K_g$ is satisfied.

Figure 6:
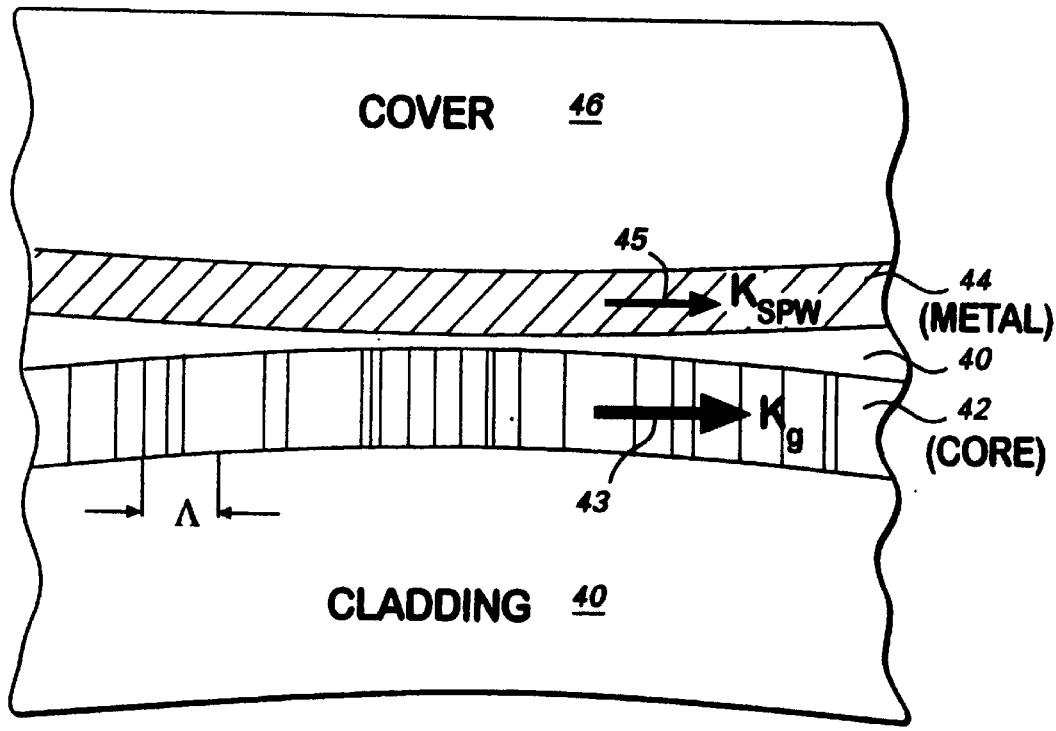
FIG. 6 is a longitudinal cross-sectional side view of a third embodiment of a cylindrical integrated optics structure for generating a SPW constructed in accordance with the invention.

With reference now to FIG. 6 there is shown in partial longitudinal cross section another embodiment of the cylindrical integrated optics structure in FIG. 5 which further includes an optical grating for more efficient excitation of a SPW. In this figure there is an index grating formed in the fiber core by varying the index of refraction of the material periodically. The index grating of the fiber core has a period $\Lambda$ and introduces an additional wavevector $K_G=2\pi/\Lambda$, which can be used for phase velocity matching. An example of this is depicted in the graphical representation of FIG. 6a. where the grating with an appropriately chosen period can be used to satisfy the matching condition as $K_{spw}=K_g-2K_G$. It is important to note that in principle there is always a grating period which can couple any guided mode $K_g$ to any supported SPW mode, $K_{spw}$, since the general matching condition involving a grating is expressed as $K_{spw}=K_g\pm N\ K_G$, where N is an arbitrary positive integer. The thicknesses and the composition of the individual layers, except the core thickness and the core and cladding composition which are given parameters, as well as the grating period are optimized via the optimization technique described in Anemogiannis, et al., such that the condition $K_{spw}=K_g\pm N\ K_G$ is satisfied.

There have been shown previously various structures of the integrated optics type which can be used to excite a SPW with a guided lightwave. However, because of the relatively precise nature of the materials and thicknesses of the layers which need to be designed to produce the matching condition it is relatively difficult to modulate the light wavevector.

Figure 7:
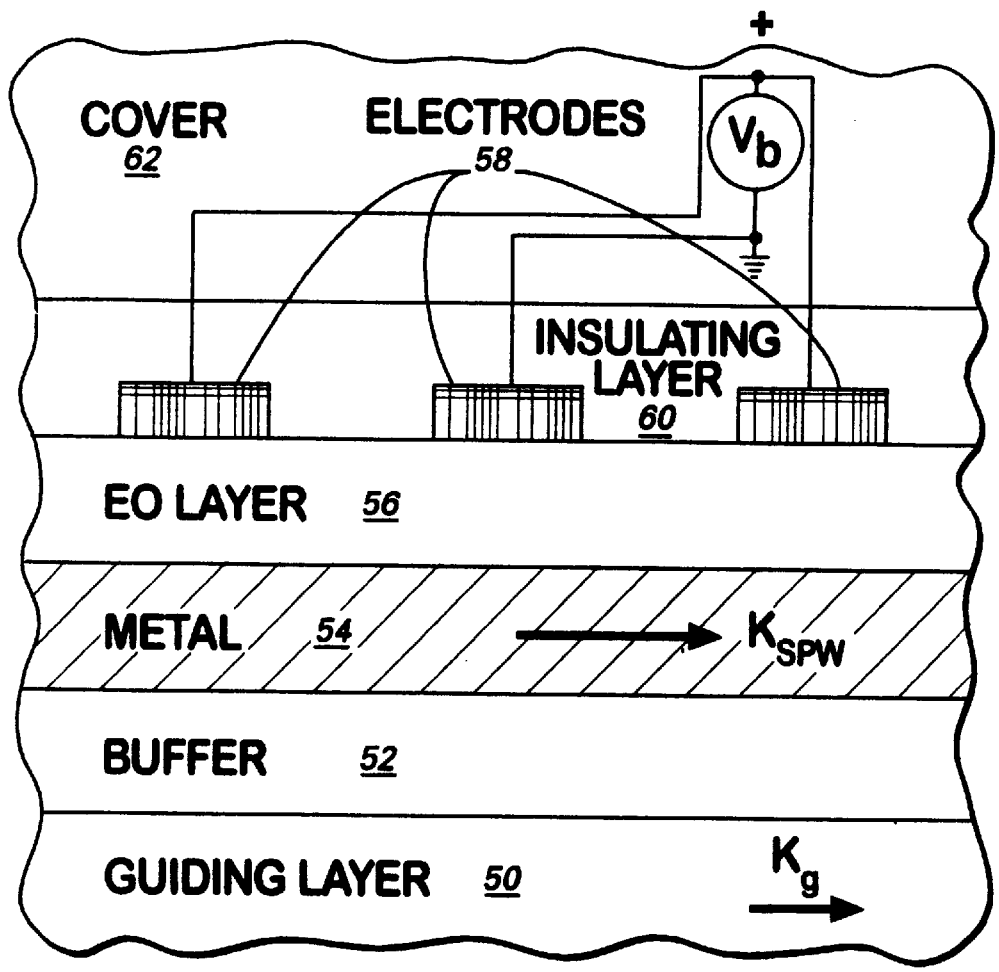
FIG. 7 is a cross-sectional side view of a modulation structure constructed in accordance with the invention which can be utilized with the SPW generation and support structures illustrated in FIGS. 3–6 to provide optical modulators.

In FIG. 7, there is shown in partial cross section a preferred embodiment of a modulator structure which is capable of varying (modulating) the coupling between the SPW and the guided lightwave electrically. This planar integrated structure is designed independently of the SPW generation and support structure and is located in contact with the single or multiple metal layers of that structure which supports the SPW. It is applicable for both the planar geometry integrated optics structures shown in FIGS. 3 and 4 and the cylindrical geometry integrated optics structures shown in FIGS. 5 and 6.

The modulator structure is comprised of a EO layer 56, preferably Lithium Niobate or Titanium Niobate, in direct optical contact to the metal layer 54 which is responsible for the generation and propagation of the SPW in both the planar and cylindrical geometries. As has been described previously, the metal layer may reside on the top of optional buffer layer(s) 52. The option buffer layer(s) have a dual purpose. First they isolate the guided lightwave which propagates in the guiding layer 50 from the metal layer reducing the insertion loss of the device. Second the buffer layer(s) may be used for setting the optical structure to the matching state $K_{spw}=K_g$ when there is no grating or to the matching condition $K_{SPW}=K_g\pm N\ K_G$ when there is a grating in the optical structure.

The refractive index of the EO layer 56 varies with the application of a voltage at the electrodes 58 located on the top side of the EO layer 58. The electrodes 56 form a coplanar waveguide (CPW) or a asymmetric coplanar waveguide (ACPW) which can be driven by modulating frequencies up to 20 MHz. or higher. Assuming a voltage is applied to the electrodes 58, the refractive index change of the EO layer is given as:

$$\Delta n = 0.5\ n^3 r\ \Gamma \Lambda/d$$

where n is the refractive index of the EO layer when V=0; d is the electrode separation; r is the EO coefficient for the particular EO material, and $\Gamma \approx 0.5$ is a factor for the imperfect overlap between the electric field dynamics lines and the EO layer. An optional layer 60 with a high dielectric constant can be deposited on top of the electrodes to allow higher voltages between the electrodes. Finally, a top layer 62 comprising an insulator can constitute a semi-infinite cover region. An alternative electrode configuration would be to position a set of electrodes on the sides of the EO layer 56. The electric field lines of this configuration more efficiently change the refractive index of the EO layer 56, i.e., the factor $\Gamma$ is closer to 1.

The SPW modulator structure design involves two steps which includes the determination of the optimum thickness of the modulator layers, the EO layer and the electrode layers, and the length of the modulator. Optimum layer thicknesses are necessary for efficient modulation, i.e., small modulation voltages, low bias voltage, large modulation depth, and minimal insertion loss. The modulator length is also an important performance parameter since a modulator longer than the optimal length has reduced obtainable modulation depth and high insertion loss, while a modulator length less than the optimum decreases the attainable modulation depth and the output light extinction ratio.

The thicknesses of the modulator strucutre layers may be determined by the method set forth in the previously referenced publication by Anemogiannis, et al. The length of the modulator strucutre may be determined by the method set forth in the previously referenced publication by Driessen, et al.

Figure 8:
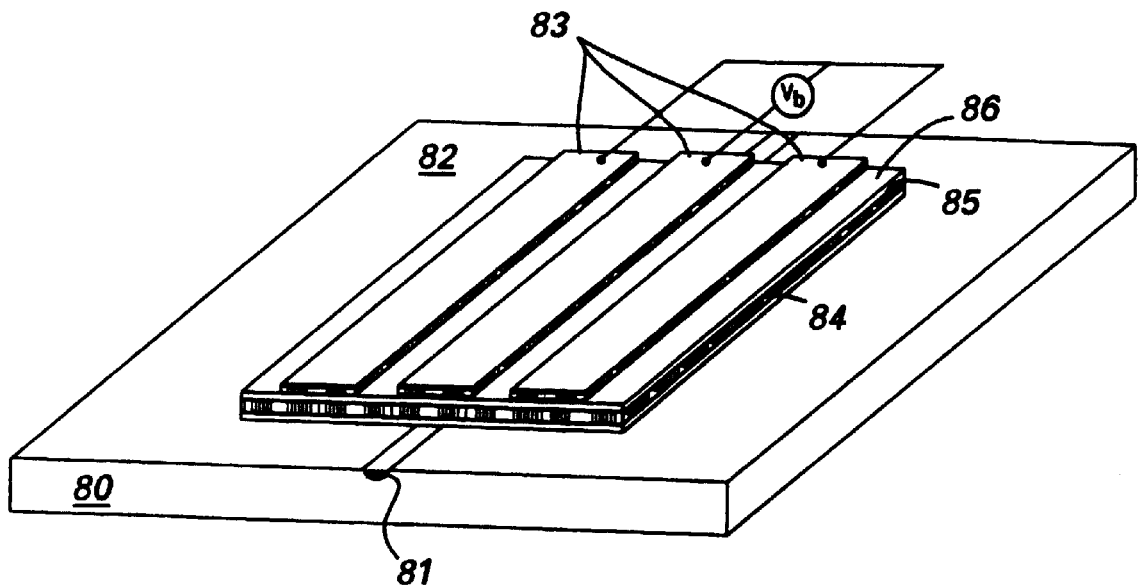
FIG. 8 is perspective view of a fourth embodiment of an planar integrated optics SPW modulator constructed in accordance with the invention.

In FIG. 8, an embodiment of a planar integrated optics SPW modulator is illustrated. The substrate material 80 constitutes an optical crystal, such as Lithium Niobate, optical glass, semiconductor, etc., in which a optical channel waveguide 81 is formed. The optical waveguide 81 forms the guiding layer for the structure. After the deposition of an additional buffer layer 84, the modulator structure 82, which was more fully described with respect to FIG. 7, is positioned at the top of the channel waveguide 81. The positioning is such that the metal layer 85 is in optical contact with the buffer layer 84. An application of a voltage on the modulator electrodes 83, causes the refractive index variation of the EO layer 86 which is in direct optical contact to the metal layer 85. The EO layer index variation perturbs the SPW wavevector from its quiescent value and alters the power coupling coefficient between the SPW and the guided wave. This power coupling variation causes the intensity of the transmitted guided light to be proportional to the voltage applied to the electrodes 83.

Further embodiments include structures where the planar SPW modulator has an optical grating to assist the wavevector matching. In these instances a surface relief grating may be formed on the top of the optical waveguide 81 before the modulator structure is mounted thereon, or an index grating may be formed inside the optical waveguide 81 when it is being formed.

A microstrip modulator which may also be used with this and the other embodiments of the invention is shown in *Optical Intensity Modulator Using Diazo-Dye-Subsitituted Polymer Channel Waveguide* by Shute, et al. in *IEEE Journal of Quantum Electronics*, Vol. 31, No. 8, August 1995. The disclosure of Shute, et al, is incorporated by reference.

Figure 9:
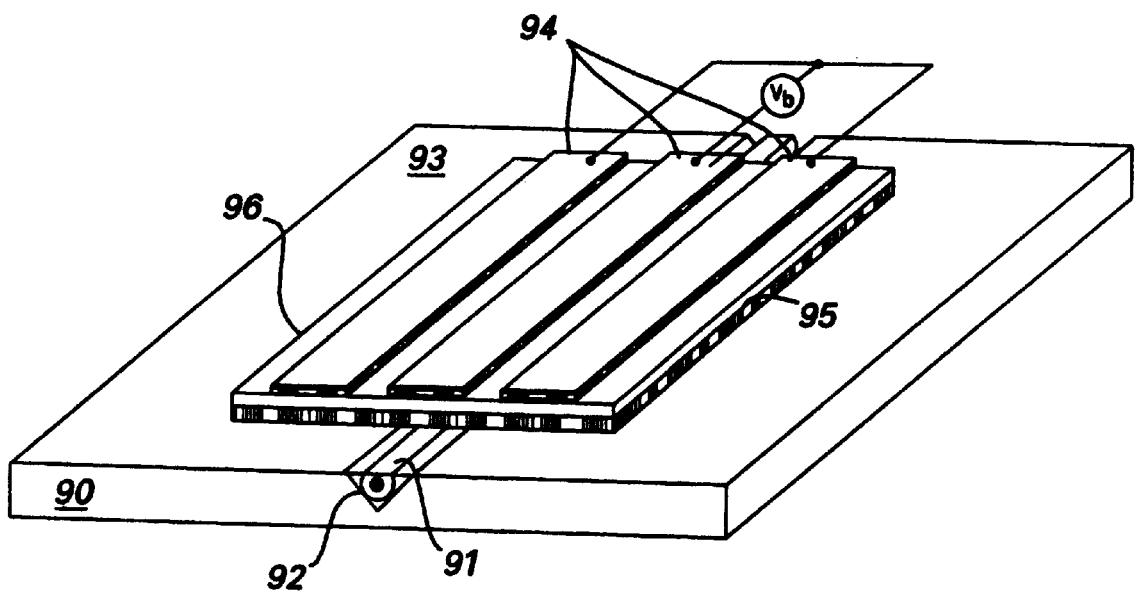
FIG. 9 is perspective view of a fifth embodiment of an cylindrical integrated optics SPW modulator constructed in accordance with the invention.

In FIG. 9, an embodiment of a cylindrical integrated optics (optical fiber) SPW modulator is illustrated. The optical fiber SPW modulator is built on a base block 90 which can be quartz or fused silica. A V groove 91 is cut into the block and is used to support and direct an optical fiber 92. The V groove also serves as a restraint so that a flat face can be produced on the optical fiber by polishing away the cladding extending above the surface of the block 90. The groove depth is calculated such that after polishing away the fiber cladding extending over the surface of the block, the thickness of the residual cladding is that required for SPW and guided lightwave wavevector matching. The modulator structure, more fully described in FIG. 7 is attached to the top of the block 90 such that the EO layer is in contact with the metal layer. As described previously, the application of a voltage on the modulator electrodes 94 introduces a refractive index variation in the EO layer 96, which in turn perturbs the wavevector of the SPW supported in the metal layer 96. The SPW wavevector variations translate to power coupling coefficient variations between the SPW and the guided lightwave propagating in the optical fiber 92 thereby causing the transmitted light intensity variations inside of the fiber 92. For an embodiment of the optical fiber SPW modulator which includes a grating for wavevector matching, the grating can be formed inside the fiber core as an index grating as previously described.

Another suitable coplanar strip modulator structure which can be used with this embodiment and other embodiments of the cylindrical (optical fiber guiding layer) geometry is shown in *Continuous Fiber Modulator With Figh Bandwidth Coplanar Strip Electrodes* by Creany, et al. in *IEEE Photonics Technology Letters*, pp 355–357, Vol. 8, No. 3, March 1996. The disclosure of Creany, et al. is incorporated herein.

Figure 10:
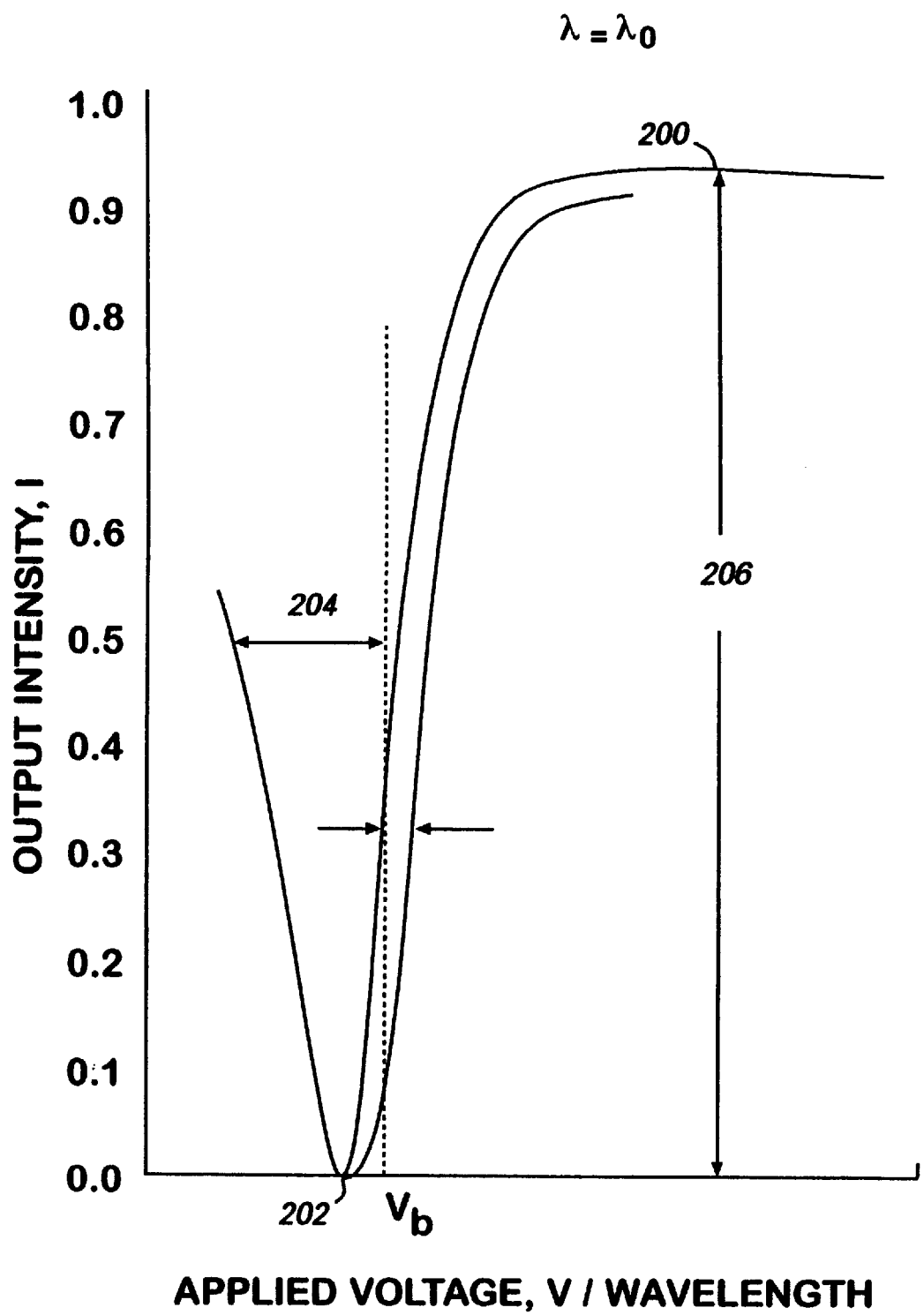
FIG. 10 is a graphical representation of output light intensity as a function of bias voltage and input light wavelength for the modulators illustrated in FIGS. 8 and 9.

FIG. 10 is an exemplary representation of the characteristic performance of the SPW structures. The general characteristic is a resonance curve 200 in which intensity of the transmitted source light is shown as a function of wavelength and concurrently as a similar function of bias voltage. Without a bias, the resonance curve as a function of wavelength demonstrates a minima point 202 at a particular wavelength. This is where the maximum attenuation of the guided light wavevector occurs because of maximum coupling of the light into a SPW by the structure. For wavelengths of light not within the resonance curve, there is substantially no attenuation. Therefore, the structures in FIGS. 3, 4, 5 and 6 are wavelength dependent attenuators and optical notch filters which can, to varying degrees, be designed having a characteristic for a specific wavelength resonance minima 202, bandwidth 204 and attenuation percentage 206.

The addition of the modulator structure to the basic attenuator configuration provides a means to shift the resonance curve to higher or lower wavelengths caused by the refractive index change in the EO layer of the modulation structure. If a DC bias voltage is applied, a wavelength sensitive variable attenuator or filter as described above can be produced. An alternating or changing bias will produce modulation which can be linear or nonlinear as desired. For example, a nonlinear modulation can be provided for digital or switching applications. By biasing the modulator electrodes at $V_b$ Volts, such that the device operates on one side of the resonance curve over a small variations in voltage, a modulator small signal response can be obtained that is substantially linear and with an output intensity approximating a linear function of the applied bias voltage.

In summary, the optimum condition for SPW generation with evanescent coupling is:

$K_g = K_{SPW}$, while for the grating coupling configurations, the excitation condition is:

$K_{IN} = K_{SPW} \pm N\, K_G$, where N is an integer.

The advantage of the grating-assisted coupling over the evanescent coupling scheme is that the grating facilitates energy coupling from the guided mode to the SPW for every Kg and $K_{SPW}$, i.e., in principle there is always a grating period which can couple a guided mode to a plasmon mode with any value of $K_{SPW}$.

There has been shown the generation of SPWs in integrated optical waveguides having a planar or cylindrical configuration.

The invention utilizes a novel SPW control configuration and generation configuration. The electric field which is responsible for the change of the refractive index of the EO layer is applied via a set of electrodes positioned on the top side or the lateral sides of the EO layer.

In addition, the invention provides the use of integrated optical gratings, including or surface relief and index gratings, to assist coupling between the optical mode and the SPW. For the case of the planar optical structure, an optical grating can be in contact with the guiding layer and the metal layer supporting the SPW for best results. For the case of an optical fiber SPW modulator, the optical grating can be an index fiber grating formed in the fiber core.

While the invention has been described in connection with a preferred embodiment, this specification is not intended to limit the scope of the invention to the particular forms set forth, but, on the contrary, it is intended to cover any such alternatives, modifications, and equivalents as may be included within the spirit and scope of the invention as defined by the appended claims.

What is claimed is:

1. An integrated optics modulator for the intensity modulation of a guided lightwave having a given wavelength, said modulator comprising:
   a multilayer waveguide comprising:
      a thin metallic layer having a thickness designed to support at least one surface plasmon wave mode, and
      a first dielectric layer located on one side of said metallic layer forming a guiding layer of the waveguide and supporting at least one guided mode of said lightwave into and out of said waveguide; and a modulation structure comprising:
a second dielectric layer located on the other side of the metallic layer and formed of electro-optic material whose refractive index may be varied, and
means for electrically varying the refractive index of said electro-optic material to perturb the propagation constant of said at least one plasmon wave mode in said thin metallic layer and thereby the coupling coefficient of the guided lightwave into the surface plasmon wave, said varying means having a set of electrodes on and electrically connected to the electro-optic material opposite the metallic layer.

2. An integrated optical modulator for the intensity modulation of a guided lightwave as set forth in claim 1, wherein:
said guiding layer has a planar geometry.

3. An integrated optical modulator for the intensity modulation of a guided lightwave as set forth in claim 1, wherein:
said guiding layer has a cylindrical geometry.

4. An integrated optical modulator for the intensity modulation of a guided lightwave as set forth in claim 3, wherein:
said guiding layer is the core of an optical fiber.

5. An integrated optical modulator for the intensity modulation of a guided lightwave as set forth in claim 1, wherein:
said refractive index is varied by an electric field that is applied through a set of substantially coplanar electrodes located on the surface of said electro-optic material opposite said thin metallic layer.

6. An integrated optical modulator for the intensity modulation of a guided lightwave as set forth in claim 1, wherein:
said refractive index is varied by an electric field that is applied through a pair of substantially parallel electrodes located on the sides of said electro-optic material opposite said thin metallic layer.

7. An integrated optical modulator for the intensity modulation of a guided lightwave as set forth in claim 1, which further comprises:
means for matching the propagation constant of the guided lightwave in the guiding layer to the real part of the complex propagation constant of a selected mode of a surface plasmon wave in said thin metallic layer.

8. An integrated optical modulator for the intensity modulation of a guided lightwave, as set forth in claim 7, wherein said matching means comprises:
an optical grating interposed between the guiding layer and the thin metallic layer.

9. An integrated optical modulator for the intensity modulation of a guided lightwave as set forth in claim 8, wherein said matching means comprises:
a surface relief optical grating interposed between the guiding layer and the thin metallic layer.

10. An integrated optical modulator for the intensity modulation of a guided lightwave as set forth in claim 7, wherein said matching means comprises:
an optical index grating integrated into said guiding layer.

11. An integrated optical modulator for the intensity modulation of a guided lightwave as set forth in claim 1, wherein;
said thin metallic layer is produced from the group consisting of gold, silver, copper, cadmium, aluminum, indium and chromium.

12. An integrated optical modulator for the intensity modulation of a guided lightwave as set forth in claim 11, wherein:
said thin metallic layer is comprised of more than one metallic layer component.

13. An integrated optics attenuator as set forth in claim 1, wherein:
said more than one metallic layer component is produced from the group consisting of gold, aluminum, cadmium, silver, copper, indium and chromium.

14. An integrated optics attenuator for the intensity modification of a guided lightwave having a given wavelength, said attenuator comprising:
a multilayer waveguide comprising:
a thin metallic layer having a thickness designed to support at least one surface plasmon wave mode;
a dielectric layer located on one side of said metallic layer forming a guiding layer of the waveguide and supporting at least one guided mode of the lightwave into and out of said waveguide; and
means for matching the propagation constant of the guided lightwave in the guided layer to the real part of the complex propagation constant of a selected mode of a surface plasmon wave in said thin metallic layer, said matching means comprising:
an optical index grating integrated into said guiding layer.

15. An integrated optics attenuator for the intensity modification of a guided lightwave having a given wavelength as set forth in claim 14, wherein:
said guiding layer has a planar geometry.

16. An integrated optics attenuator as set forth in claim 14, wherein:
said guiding layer has a cylindrical geometry.

17. An integrated optics attenuator as set forth in claim 16, wherein:
said guiding layer is the core of an optical fiber.

18. An integrated optics attenuator as set forth in claim 14, wherein:
said thin metallic layer is produced from the group consisting of gold, aluminum, cadmium, silver, copper, indium and chromium.

19. An integrated optics attenuator as set forth in claim 14, wherein:
said thin metallic layer is comprised of more than one metallic layer component.

20. An integrated optics attenuator as set forth in claim 18, wherein:
said more than one metallic layer component is produced from the group consisting of gold, aluminum, cadmium, silver, copper, indium and chromium.

21. An integrated optics variable attenuator for the intensity modification of a guided lightwave, said attenuator comprising:
a multilayer waveguide comprising:
a thin metallic layer having a thickness designed to support at least one surface plasmon wave mode;
a dielectric layer located on one side of said metallic layer forming a guiding layer of the waveguide and supporting at least one guided mode of the lightwave into and out of said waveguide;
means for matching the propagation constant of the guided lightwave in the guiding layer to the real part of the complex propagation constant of a selected mode of a surface plasmon wave in said thin metallic layer; and
means for biasing said waveguide structure with a bias voltage to perturb the matching condition, said biasing means, said biasing means comprising:
an electro-optic layer in optical contact with said metallic layer;

a set of electrodes on and electrically connected to the surface of the electro-optic layer opposite the metallic layer; and means for varying the refractive index of said electro-optic layer with said electrical bias voltage.

22. An integrated optics variable attenuator as set forth in claim 21, wherein:

said bias voltage is a variable DC voltage.

23. An integrated optics variable attenuator as set forth in claim 21, wherein:

said bias voltage is a fixed DC voltage.

24. An integrated optics variable attenuator as set forth in claim 21, wherein:

said bias voltage is an AC voltage.

25. An integrated optics variable attenuator as set forth in claim 21, wherein:

said guiding layer has a planar geometry.

26. An integrated optics variable attenuator as set forth in claim 21, wherein:

said guiding layer has a cylindrical geometry.

27. An integrated optics variable attenuator as set forth in claim 26, wherein:

said guiding layer is the core of an optical fiber.

28. An integrated optics variable attenuator as set forth in claim 21, wherein said matching means includes:

an optical grating interposed between the guided layer and the thin metallic layer.

29. An integrated optics variable attenuator as set forth in claim 28, wherein said matching means comprises:

a surface relief optical grating interposed between the guiding layer and the thin metallic layer.

30. An integrated optics variable attenuator as set forth in claim 21, wherein said matching means comprises:

an optical index grating integrated into said guiding layer.

31. An integrated optics variable attenuator as set forth in claim 21, wherein:

said thin metallic layer is produced from the group consisting of gold, aluminum, cadmium, silver, copper, indium and chromium.

32. An integrated optics variable attenuator as set forth in claim 21, wherein:

said thin metallic layer is comprised of more than one metallic layer component.

33. An integrated optics variable attenuator as set forth in claim 32, wherein:

said more than one metallic layer component is produced from the group consisting of gold, aluminum, cadmium, silver, copper, indium and chromium.

34. An integrated optics attenuator for the intensity modulation of a guided lightwave as set forth in claim 21, wherein:

said refractive index is varied by an electric field that is applied through said electrodes, said electrodes comprising a set of substantially coplanar electrodes located on the surface of said electro-optic layer opposite said thin metallic layer.

35. An integrated optics attenuator for the intensity modulation of a guided lightwave as set forth in claim 21, wherein:

said refractive index is varied by an electric field that is applied through said electrodes, said electrodes comprising a pair of substantially parallel electrodes located on the sides of said electro-optic layer opposite said thin metallic layer.

36. An integrated optics modulator for the intensity modulation of a guided lightwave having a given wavelength, said modulator comprising:

a multilayer waveguide comprising:

a thin metallic layer having a thickness designed to support at least one surface plasmon wave mode, and a first dielectric layer located on one side of said metallic layer forming a guiding layer of the waveguide and supporting at least one guided mode of said lightwave into and out of said waveguide;

a modulation structure comprising:

a second dielectric layer located on the other side of the metallic layer and formed of electro-optic material whose refractive index may be varied, and means for electrically varying the refractive index of said electro-optic material to perturb the propagation constant of said at least one plasmon wave mode in said thin metallic layer and thereby the coupling coefficient of the guided lightwave into the surface plasmon wave; and means for matching the propagation constant of the guided lightwave in the guiding layer to the real part of the complex propagation constant of a selected mode of a surface plasmon wave in said thin metallic layer comprising:

an optical index grating integrated into said guiding layer.

37. An integrated optical modulator for the intensity modulation of a guided lightwave as set forth in claim 36, wherein:

said guiding layer has a planar geometry.

38. An integrated optical modulator for the intensity modulation of a guided lightwave as set forth in claim 36, wherein:

said guiding layer has a[]cylindrical geometry.

39. An integrated optical modulator for the intensity modulation of a guided lightwave as set forth in claim 38, wherein:

said guiding layer is the core of an optical fiber.

40. An integrated optical modulator for the intensity modulation of a guided lightwave as set forth in claim 36, wherein:

said refractive index is varied by an electric field that is applied through a set of substantially coplanar electrodes located on the surface of said electro-optic material opposite said thin metallic layer.

41. An integrated optical modulator for the intensity modulation of a guided lightwave as set forth in claim 36, wherein:

said refractive index is varied by an electric field that is applied through a pair of substantially parallel electrodes located on the sides of said electro-optic material opposite said thin metallic layer.

42. An integrated optical modulator for the intensity modulation of a guided lightwave as set forth in claim 36, wherein;

said thin metallic layer is produced from the group consisting of gold, silver, copper, cadmium, aluminum, indium and chromium.

43. An integrated optical modulator for the intensity modulation of a guided lightwave as set forth in claim 42, wherein:

said thin metallic layer is comprised of more than one metallic layer component.

44. An integrated optics variable attenuator for the intensity modification of a guided lightwave, said attenuator comprising:

a multilayer waveguide comprising:
- a thin metallic layer having a thickness designed to support at least one surface plasmon wave mode;
- a dielectric layer located on one side of said metallic layer forming a guiding layer of the waveguide and supporting at least one guided mode of the lightwave into and out of said waveguide;
- means for matching the propagation constant of the guided lightwave in the guiding layer to the real part of the complex propagation constant of a selected mode of a surface plasmon wave in said thin metallic layer, said matching means comprising:
    - an optical index grating integrated into said guiding layer; and
- means for biasing said waveguide structure with a bias voltage to perturb the matching condition, said biasing means comprising:
    - an electro-optic layer in optical contact with said metallic layer; and
    - means for varying the refractive index of said electro-optic layer with said electrical bias voltage.

45. An integrated optics variable attenuator as set forth in claim 44, wherein:
said bias voltage is a variable DC voltage.

46. An integrated optics variable attenuator as set forth in claim 44, wherein:
said bias voltage is a fixed DC voltage.

47. An integrated optics variable attenuator as set forth in claim 44, wherein:
said bias voltage is an AC voltage.

48. An integrated optics variable attenuator as set forth in claim 44, wherein:
said guiding layer has a planar geometry.

49. An integrated optics variable attenuator as set forth in claim 44, wherein:
said guiding layer has a cylindrical geometry.

50. An integrated optics variable attenuator as set forth in claim 49, wherein:
said guiding layer is the core of an optical fiber.

51. An integrated optics variable attenuator as set forth in claim 44, wherein:
said thin metallic layer is produced from the group consisting of gold, aluminum, cadmium, silver, copper, indium and chromium.

52. An integrated optics variable attenuator as set forth in claim 44, wherein:
said thin metallic layer is comprised of more than one metallic layer component.

53. An integrated optics variable attenuator as set forth in claim 52, wherein:
said more than one metallic layer component is produced from the group consisting of gold, aluminum, cadmium, silver, copper, indium and chromium.

* * * * *

UNITED STATES PATENT AND TRADEMARK OFFICE
CERTIFICATE OF CORRECTION

PATENT NO. : 6,034,809

DATED : March 7, 2000

INVENTOR(S) : Emmanuel Anemogiannis

It is certified that error appears in the above-identified patent and that said Letters Patent is hereby corrected as shown below:  On the title page, item:

[73], change the Assignee name from "Verifier Technologies, Inc., Duluth, Georgia" to --VeriFiber Technologies, Inc.,, Duluth, Georgia--.

Column 12, lines 64-65, change "said biasing means, said biasing means" to --said biasing means--.

Signed and Sealed this

Sixth Day of March, 2001

*Attest:*

NICHOLAS P. GODICI

*Attesting Officer*         *Acting Director of the United States Patent and Trademark Office*